(12) United States Patent
Spadari (10) Patent No.: US 7,409,602 B2
(45) Date of Patent: Aug. 5, 2008

(54) METHODOLOGY FOR DEBUGGING RTL SIMULATIONS OF PROCESSOR BASED SYSTEM ON CHIP

(75) Inventor: Maurizio Spadari, Bussero (IT)

(73) Assignee: LSI Corporation, Milpitas, CA (US)

( * ) Notice: Subject to any disclaimer, the term of this patent is extended or adjusted under 35 U.S.C. 154(b) by 621 days.

(21) Appl. No.: 10/706,127

(22) Filed: Nov. 12, 2003

(65) Prior Publication Data

US 2005/0102583 A1    May 12, 2005

(51) Int. Cl.
*G06F 11/00* (2006.01)
(52) U.S. Cl. .............................. 714/45; 717/128; 703/28
(58) Field of Classification Search ..................... 714/29
See application file for complete search history.

(56) References Cited

U.S. PATENT DOCUMENTS

| | | | |
|---|---|---|---|
| 5,838,948 A * | 11/1998 | Bunza | 703/27 |
| 6,003,143 A * | 12/1999 | Kim et al. | 714/38 |
| 6,026,230 A * | 2/2000 | Lin et al. | 703/13 |
| 6,052,524 A * | 4/2000 | Pauna | 703/22 |
| 6,606,671 B1 * | 8/2003 | McNamer et al. | 710/18 |
| 6,678,645 B1 * | 1/2004 | Rajsuman et al. | 703/20 |
| 6,694,427 B1 * | 2/2004 | Mericas et al. | 712/227 |
| 6,718,485 B1 * | 4/2004 | Reiser | 714/38 |
| 6,769,116 B1 * | 7/2004 | Sexton | 717/130 |
| 7,072,820 B1 * | 7/2006 | Bailey et al. | 703/17 |
| 2002/0019969 A1 * | 2/2002 | Hellestrand et al. | 716/5 |
| 2005/0102572 A1 * | 5/2005 | Oberlaender | 714/29 |

* cited by examiner

*Primary Examiner*—Gabriel Chu
(74) *Attorney, Agent, or Firm*—Christopher P. Maiorana, PC (57) ABSTRACT

An apparatus comprising an analysis block, a graphic user interface and a memory circuit. The analysis block may be configured to generate debug information in response to (i) a command input, (ii) one or more simulation outputs, and (iii) one or more compiler outputs. The graphic user interface may be configured (i) to present the command input in response to one or more user input parameters and (ii) to display the debug information. The memory circuit may be configured to store the one or more simulation outputs and said one or more compiler outputs.

22 Claims, 10 Drawing Sheets

DEBUG

MEMORY MAP [GET ACCESSES] ☐ LITTLE-ENDIAN ☐ SPLIT

502

MEMMAP  0xffff_ffff:0x0000_0000:
 UART  0x00b10_0000:0x00b00_0000:
  UART_RX_BUFFER_REG  0x00b00_0000:0x00b00_0000:
  UART_INTERRUPT_EN_REG  0x00b00_0004:0x00b00_000
  UART_INTERRUPT_ID_REG  0x00b00_0008:0x00b00_0000
  UART_LINE_CTRL_REG  0x00b00_000c:0x00b00_000c:
  UART_MODEM_CTRL_REG  0x00b00_0010:0x00b00_0010

504

ACCESS LIST    [GET INSTRUCTION]

| CLK CYCLE | TYPE | ADDRESS | DATA | BYTE-EN | REG |
|---|---|---|---|---|---|
| 30723 | RD | 0x00b000000 | 0x00------ | 1000 | 0x00 |
| 102254 | W | 0x00b000000 | 0x0c------ | 1000 | 0x0c |
| 106731 | RD | 0x00b000000 | 0x00------ | 1000 | 0x00 |
| 112070 | W | 0x00b000000 | 0xa5------ | 1000 | 0xa5 |
| 130707 | RD | 0x00b000000 | 0xa5------ | 1000 | 0xa5 |
| 155462 | W | 0x00b000000 | 0x06------ | 1000 | 0x06 |
| 130707 | RD | 0x00b000000 | 0x06------ | 1000 | 0x06 |
| 159899 | W | 0x00b000000 | 0xa5------ | 1000 | 0xa5 |
| 165238 | RD | 0x00b000000 | 0xa5------ | 1000 | 0xa5 |
| 175563 | W | 0x00b000000 | 0xa5------ | 1000 | 0xa5 |
| 200298 | RD | 0x00b000000 | 0x03------ | 1000 | 0x03 |
| 204695 | W | 0x00b000000 | 0xa5------ | 1000 | 0xa5 |
| 210034 | RD | 0x00b000000 | 0xa5------ | 1000 | 0xa5 |
| 216363 | W | 0x00b000000 | 0xa5------ | 1000 | 0xa5 |

FILTER ACCESS  ☐ W  ☐ RD  ☐ RI

FIG. 7

| ACCESS LIST | | | GET INSTRUCTION | | |
|---|---|---|---|---|---|
| CLK CYCLE | TYPE | ADDRESS | DATA | BYTE-EN | REG |
| 102254 | W | 0x00b000000 | 0x0c------ | 1000 | 0x0c |
| 112070 | W | 0x00b000000 | 0xa5------ | 1000 | 0xa5 |
| 155462 | W | 0x00b000000 | 0x06------ | 1000 | 0x06 |
| 165238 | W | 0x00b000000 | 0xa5------ | 1000 | 0xa5 |
| 200298 | W | 0x00b000000 | 0x03------ | 1000 | 0x03 |
| 210034 | W | 0x00b000000 | 0xa5------ | 1000 | 0xa5 |
| 241578 | W | 0x00b000000 | 0x02------ | 1000 | 0x02 |
| 251314 | W | 0x00b000000 | 0xa5------ | 1000 | 0xa5 |
| 282778 | W | 0x00b000000 | 0x01------ | 1000 | 0x01 |
| 292514 | W | 0x00b000000 | 0xa5------ | 1000 | 0xa5 |
| 308270 | W | 0x00b000000 | 0xa5------ | 1000 | 0xa5 |
| 324406 | W | 0x00b000000 | 0xc5------ | 1000 | 0xc5 |
| 327804 | W | 0x00b000000 | 0xca------ | 1000 | 0xca |
| 328972 | W | 0x00b000000 | 0xdb------ | 1000 | 0xdb |
| 331080 | W | 0x00b000000 | 0xec------ | 1000 | 0xec |
| 333188 | W | 0x00b000000 | 0xfd------ | 1000 | 0xec |
| FILTER ACCESS | | ☐W | ■RD | ☐RI | |

FIG. 8

| ACCESS LIST | | GET INSTRUCTION | | | |
|---|---|---|---|---|---|
| CLK CYCLE | TYPE | ADDRESS | DATA | BYTE-EN | REG |
| 102254 | W | 0x00b000000 | 0x0c------ | 1000 | 0x0c |
| 112070 | W | 0x00b000000 | 0xa5------ | 1000 | 0xa5 |
| 155462 | W | 0x00b000000 | 0x06------ | 1000 | 0x06 |
| 165238 | W | 0x00b000000 | 0xa5------ | 1000 | 0xa5 |
| 200298 | W | 0x00b000000 | 0x03------ | 1000 | 0x03 |
| 210034 | W | 0x00b000000 | 0xa5------ | 1000 | 0xa5 |
| 241578 | W | 0x00b000000 | 0x02------ | 1000 | 0x02 |
| 251314 | W | 0x00b000000 | 0xa5------ | 1000 | 0xa5 |
| 282778 | W | 0x00b000000 | 0x01------ | 1000 | 0x01 |
| 292514 | W | 0x00b000000 | 0xa5------ | 1000 | 0xa5 |
| 308270 | W | 0x00b000000 | 0xa5------ | 1000 | 0xa5 |
| 324406 | W | 0x00b000000 | 0xc5------ | 1000 | 0xc5 |
| 327804 | W | 0x00b000000 | 0xca------ | 1000 | 0xca |
| 328972 | W | 0x00b000000 | 0xdb------ | 1000 | 0xdb |
| 331080 | W | 0x00b000000 | 0xec------ | 1000 | 0xec |
| 333188 | W | 0x00b000000 | 0xfd------- | 1000 | 0xec |

FILTER ACCESS  ☐W  ▣RD  ☐RI

METHODOLOGY FOR DEBUGGING RTL SIMULATIONS OF PROCESSOR BASED SYSTEM ON CHIP

FIELD OF THE INVENTION

The present invention relates to a debugging tool generally and, more particularly, to a methodology for debugging register transfer level (RTL) simulations of processor based system on chip (SoC).

BACKGROUND OF THE INVENTION

The validation of a processor based System-On-Chip (SoC) typically implements digital register transfer level (RTL) simulations. The simulations verify the correctness of the RTL code and system operability. A simulation model is used to emulate the processor. The processor executes one or more sample test programs in which the processor interacts with one or more peripherals. A disadvantage of the existing approach is a bottle-neck in the analysis of simulation results in case of failures.

Conventional approaches use a number of tools and methodologies to perform debugging. For example, conventional approaches include (i) manual debugging using the debugging features of digital simulators and processor simulation models, (ii) using software simulators and (iii) using co-simulators. Manual debugging involves analyzing the signal waveforms and examining the processor simulation model output files. The drawback of such an approach is the length of time needed and the number of errors.

A second conventional approach uses software simulators. The majority of processor development kits provide a software simulator. Replicating the RTL simulation on the software simulators has some draw-backs. For example, modeling the behavior of a complex peripheral (such as an Ethernet controller) can use considerable software resources and can be difficult to implement at a chip level. Furthermore, a software approach may help identify issues within a test-program, but may not be useful in debugging the RTL code.

A third conventional approach uses co-simulators. Co-simulators provide the most powerful tools for debugging by allowing a user to interact with the simulation by (i) monitoring memory accesses, (ii) observing processor status at a given point, (iii) stopping simulation at critical points by setting breakpoints, and (iv) forcing new values into register. The drawbacks of such an approach include (i) the cost of tools and (ii) the availability of suitable co-simulator models for the specific processor implemented.

It would be desirable to implement a debugging methodology that implements a graphical user interface to provide a solution that is easy to implement.

SUMMARY OF THE INVENTION

The present invention concerns an apparatus comprising an analysis block, a graphic user interface and a memory circuit. The analysis block may be configured to generate debug information in response to (i) a command input, (ii) one or more simulation outputs, and (iii) one or more compiler outputs. The graphic user interface may be configured (i) to present the command input in response to one or more user input parameters and (ii) to display the debug information. The memory circuit may be configured to store the one or more simulation outputs and the one or more compiler outputs.

The objects, features and advantages of the present invention include providing a methodology for debugging RTL simulations of processor based system-on-chip that may (i) implement a graphical user interface, (ii) allow a user to easily extract relevant data from simulation results, (iii) allow post-processing of simulation results, (iv) allow identification of instructions related to specific memory accesses, (v) display processor internal register status for a specific instruction, (vi) display program flow that resulted in target instruction execution and/or (vii) be simpler and less costly than a co-simulator.

BRIEF DESCRIPTION OF THE DRAWINGS

These and other objects, features and advantages of the present invention will be apparent from the following detailed description and the appended claims and drawings in which:

FIG. 7 is a diagram illustrating an example output of the present invention in response to a request for access information;

DETAILED DESCRIPTION OF THE PREFERRED EMBODIMENTS

The present invention may implement a debug methodology that uses a graphic (or graphical) user interface (GUI)-based tool to post-process simulation results. The present invention may allow a user to easily extract relevant data, such as (i) monitoring memory accesses to a specific location (e.g., a peripheral register), (ii) identifying the instruction related to a specific memory access, (iii) displaying the processor internal register status when a specific instruction has been executed and (iv) displaying the program flow that resulted in a target instruction being executed.

The present invention may provide a less powerful solution than a co-simulator since the present invention provides a user only with passive features. In particular, the user generally does not interact with the simulator. However, the present invention generally provides an advantage of a simpler and less costly solution compared to a co-simulator.

Figure 1:
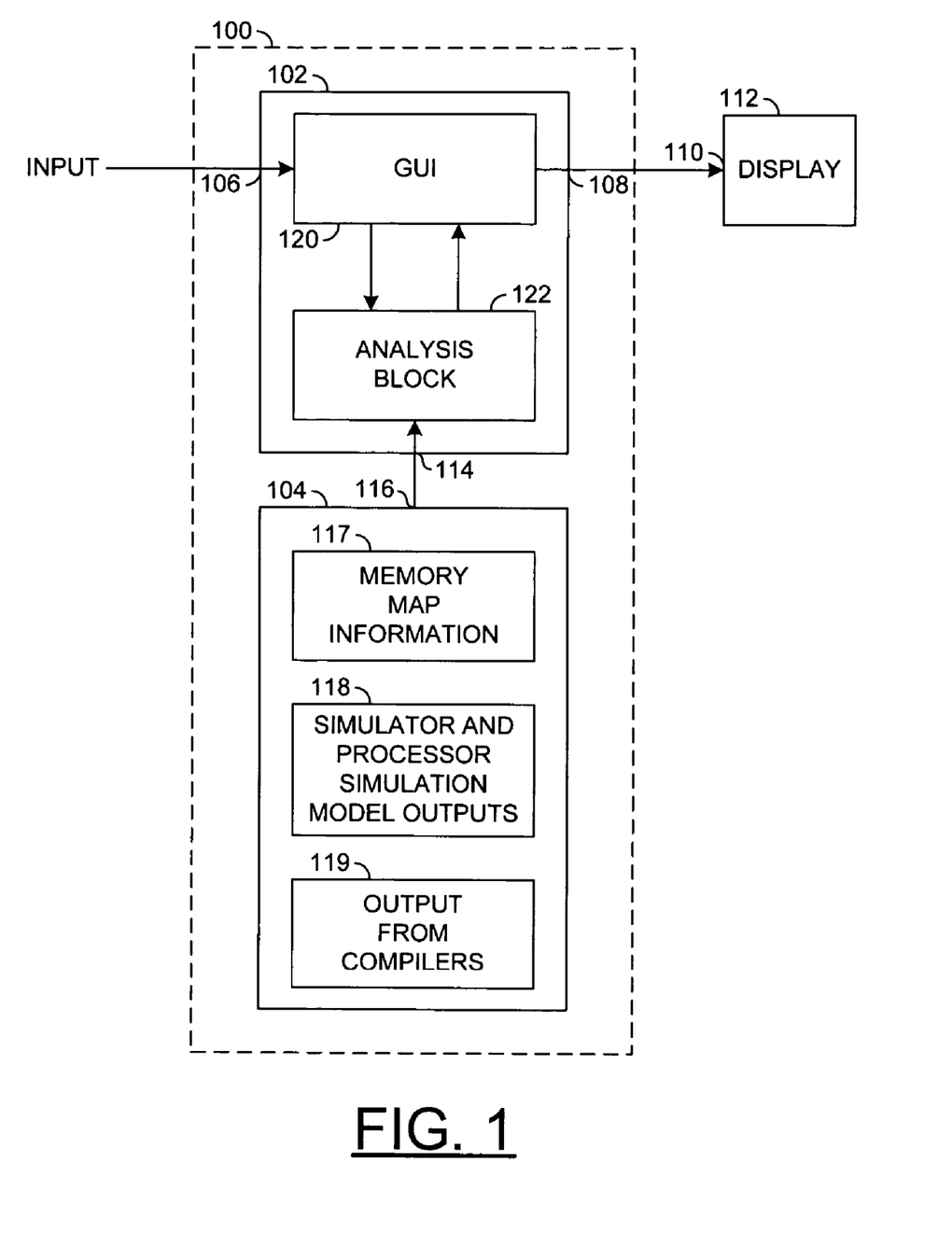
FIG. 1 is a block diagram of the present invention.

Referring to FIG. 1, a block diagram of a system (or circuit) 100 is shown in accordance with a preferred embodiment of the present invention. The system 100 generally comprises a processing block (or circuit) 102 and a storage block (or circuit) 104. The processing block 102 may have an input 106 that may receive user input (e.g., INPUT) and an output 108 that may present information to an input 110 of a display device 112. The processing block 102 may also have an input 114 that may receive information from an output 116 of the storage block 104. In one example, the processing block 102 may be implemented using a conventional general purpose digital computer programmed according to the teachings of the present specification. The storage block 104 may be implemented using any appropriate storage technology. For example, the storage block 104 may comprise one or more of any type of disk including floppy disk, optical disk, CD-ROM, DVD-ROM, and magneto-optical disks, ROMs, RAMs, CAMs, EPROMs, EEPROMs, flash memory, magnetic or optical cards or any other type of media suitable for storing data. The signal INPUT may be generated in response to or via an input device such as a mouse, a keyboard, a touch screen, voice recognition, or any other appropriate input device. In one example, the storage block 104 may contain data including, but not limited to, (i) a user defined memory map 117, (ii) outputs from simulator and processor simulation models 118 and (iii) output from one or more compilers 119.

The processing block 102 may comprise a graphic user interface (GUI) 120 and an analysis block (or circuit) 122. The GUI 120 may be configured to receive commands from a user, present information to the user and control the analysis block 122. For example, the GUI 120 may be configured (i) to present commands, either received via the signal INPUT or generated in response to the signal INPUT, to the analysis block 122 and (ii) to present results received from the analysis block 122 to the display device 112. The analysis block 122 is generally configured to generate debug information in response to (i) the commands received from the GUI 120 and (ii) information stored in and/or retrieved from the storage block 104.

Figure 2:
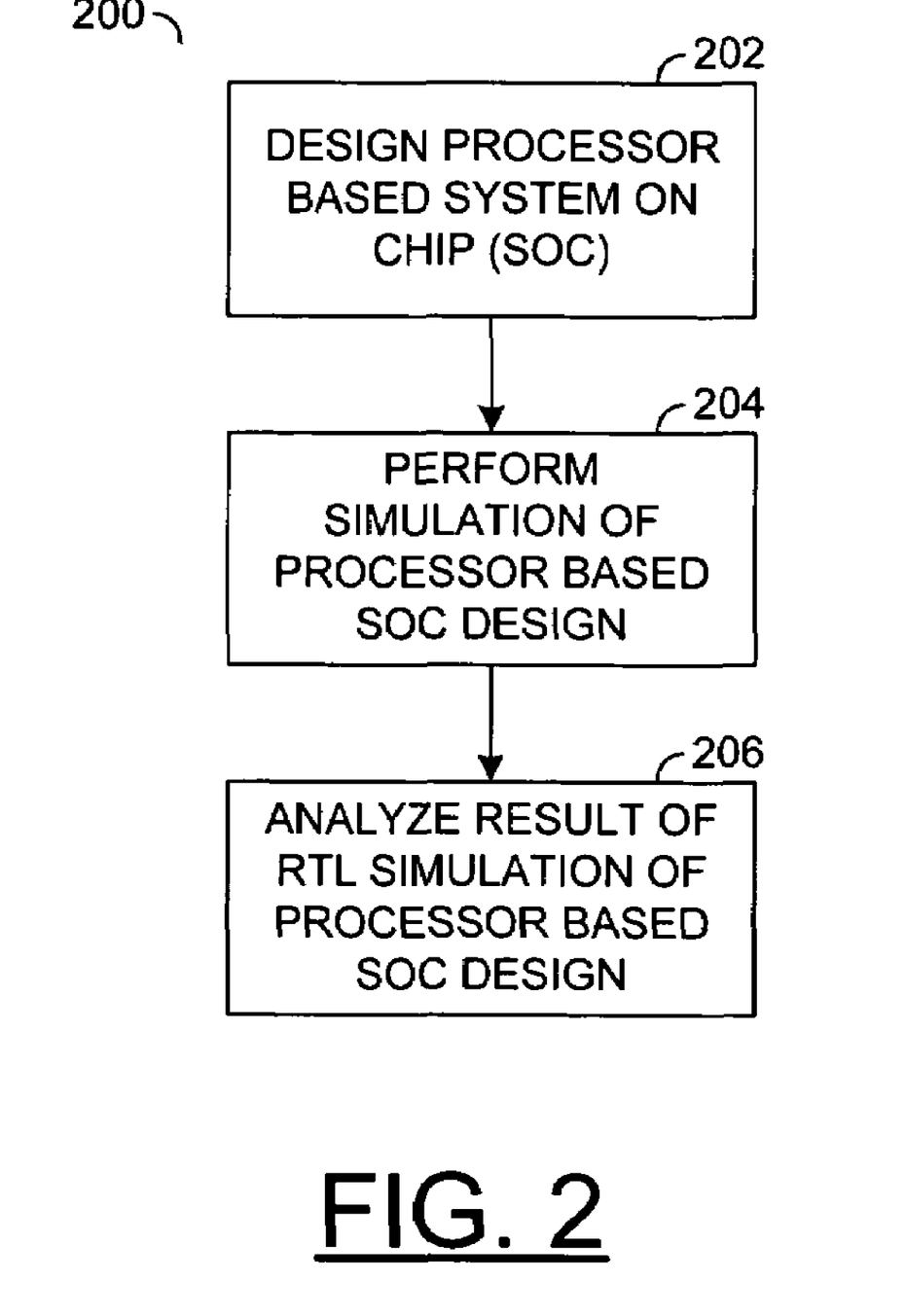
FIG. 2 is a flow diagram illustrating a SoC design process in accordance with the present invention.

Referring to FIG. 2, a flow diagram 200 is shown illustrating a design method (or process) in accordance with a preferred embodiment of the present invention. The method 200 generally comprises a state 202, a state 204 and a state 206. The state 202 may provide a design for a processor based system on chip (SoC). The state 204 may provide data based upon simulation (e.g., register transfer level (RTL) simulation) of the processor based SoC design. The state 206 may analyze the results of the simulation of the processor based SoC design.

Figure 3:
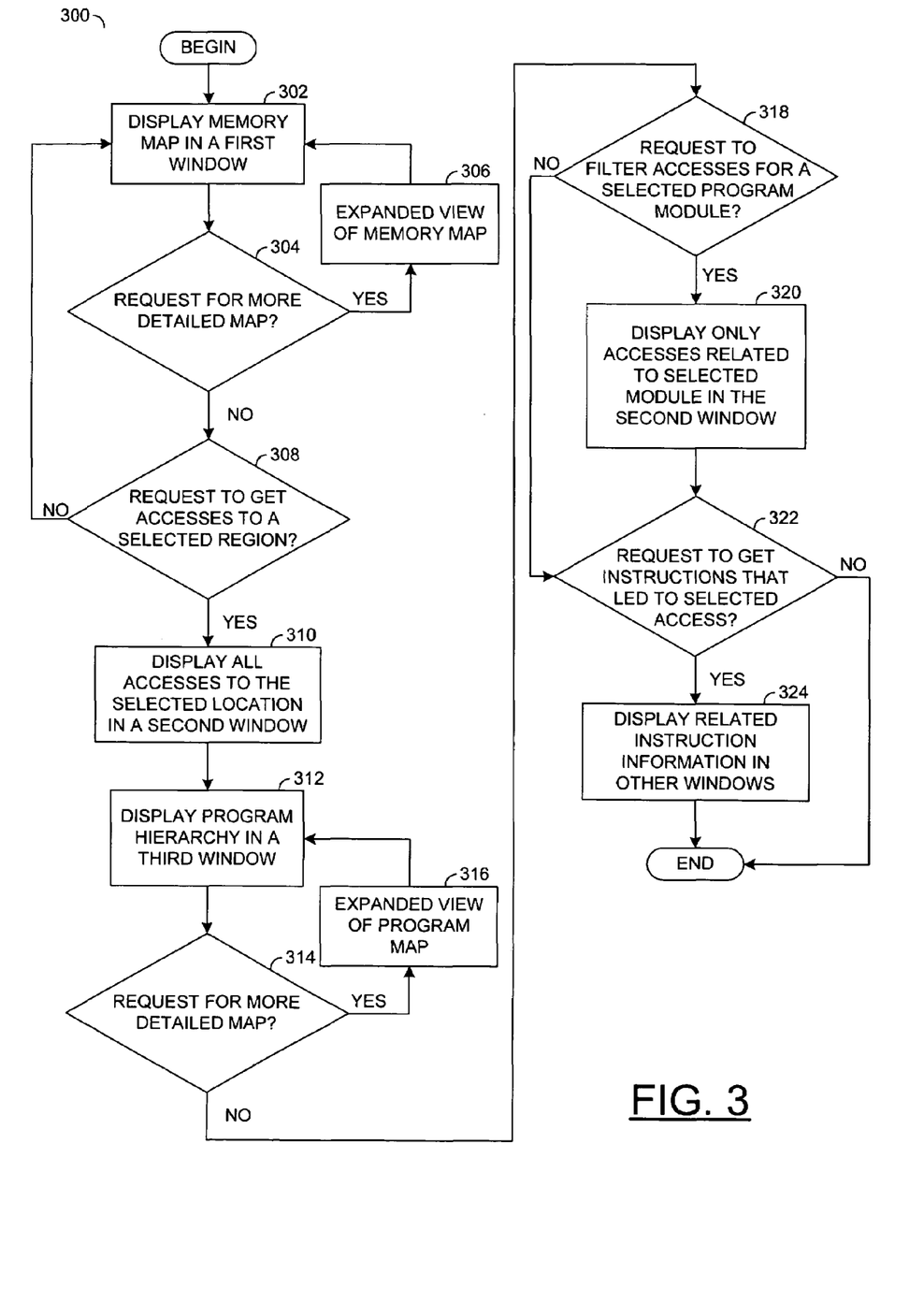
FIG. 3 is a more detailed flow diagram of an example debugging process of the present invention.

Referring to FIG. 3, a flow diagram illustrating an example of a method (or process) 300 is shown. The process 300 generally comprises a state 302, a decision state 304, a state 306, a decision state 308, a state 310, a state 312, a decision state 314, a state 316, a decision state 318, a state 320, a decision state 322 and a state 324. The state 302 generally displays entries from a user defined memory map (e.g., in a first window of a GUI). In one example, the memory map may be displayed with a hierarchical structure. For example, the memory map may comprise regions of the complete memory space, sub-regions of the regions and sub-regions of the sub-regions. The state 304 generally checks for a request for a more detailed (e.g., expanded) map (e.g., a request for display of sub-regions or a particular region, etc.). For example, when a mouse interface is implemented, double clicking on a memory region may be used to request a more detailed listing for that region. When a more detailed map is requested, the process 300 moves to the state 306. The state 306 expands the view of the memory map to show the increased detail. A similar process may be implemented to reduce the detail of the displayed memory map.

When a more detailed map is not requested, the process 300 moves to the state 308. The decision state 308 determines whether a request for retrieving accesses to a selected region has been received. When a request for retrieving accesses is received, the process 300 generally moves to the state 310. When a request for retrieving accesses is not received, the process 300 may move to the state 302. In the state 310, the process 300 generally analyzes the results (e.g., output data) from simulations and compilers and displays all accesses to the selected memory region or location (e.g., in a second window or frame).

The process 300 generally moves to the state 312. In the state 312, the process 300 generally displays a program hierarchy (e.g., in a third window) and moves to the state 314. In the decision state 314, the process 300 determines whether a request for a more detailed program map has been received. When a more detailed program map is requested, the process 300 moves to the state 316. The state 316 expands the view of the program map to show the increased detail. A similar process may be implemented to reduce the detail of the displayed program map.

When a more detailed map is not requested, the process 300 moves to the state 318. The decision state 318 determines whether a request for filtering accesses has been received. When a request for filtering accesses is received, the process 300 moves to the state 320. When a request to filter accesses is not received, the process 300 may move to the state 322. In the state 320, the process 300 reduces the number of accesses displayed according to user entered filter parameters. For example, only accesses related to a selected module may be displayed. However, other filtering parameters may be implemented accordingly to meet the design criteria of a particular application.

The process 300 may then move to the state 322. The state 322 determines whether a request to get instructions (e.g., that led to a selected access) has been received. When a request for displaying the related instruction is received, the process 300 moves to the state 324. Otherwise, the process 300 may end. Alternatively, the process 300 may move to the state 302. In the state 324, the process 300 displays related instruction information (e.g., in one or more other windows or frames). The movement of the process 300 from state to state may be varied to meet the design criteria of a particular implementation. For example, decision states may be entered in response to particular commands rather than sequentially.

Figure 4:
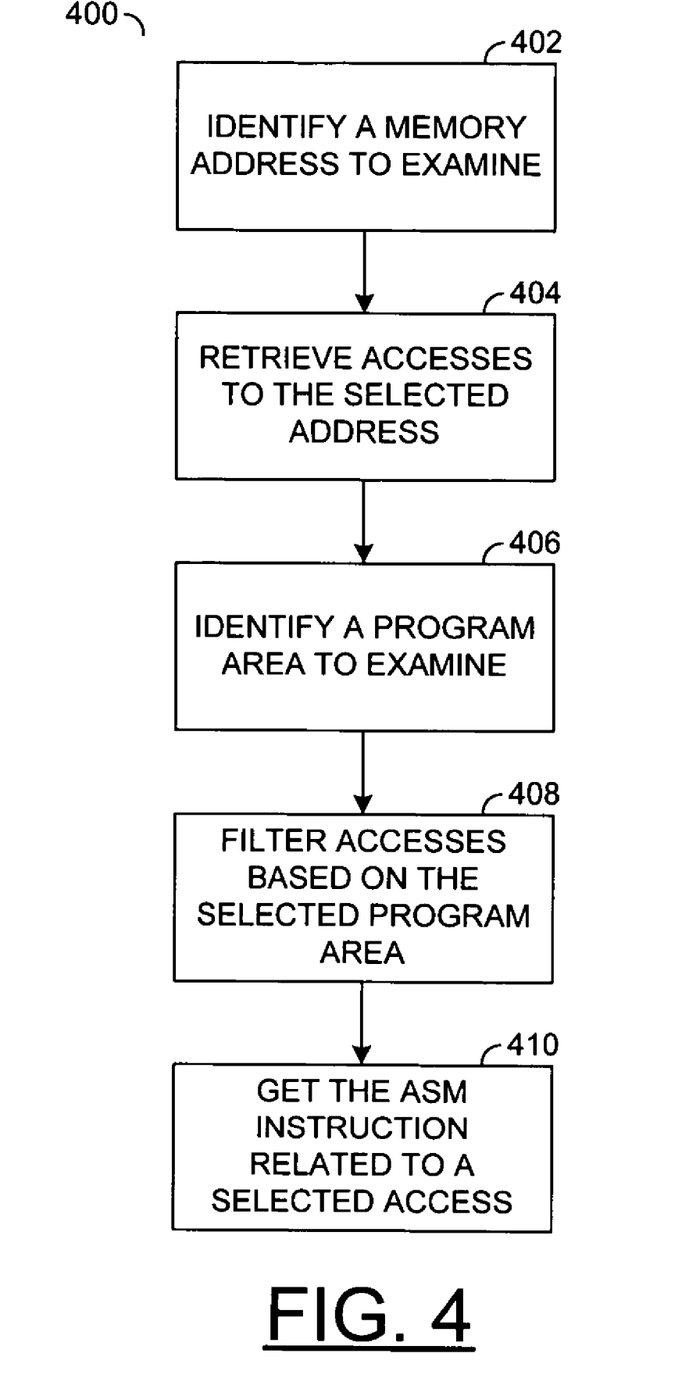
FIG. 4 is a flow diagram illustrating an example debugging process.

Referring to FIG. 4, a flow diagram is shown illustrating an example debugging process 400. In general, the debugging process 400 may begin by identifying a memory address to examine (e.g., the block 402). Once a particular memory address has been identified, the process may continue by retrieving all accesses to a selected memory address range (e.g., the block 404). The process 400 generally continues with identification of a program area to be examined (e.g., the block 406) and filtering of the accesses based on the selected program area (e.g., the block 408). Once a specific access has been identified, the process 400 generally continues by retrieving information from the outputs of the simulations and compilers related to the particular access. For example, information may be displayed related to the particular assembly instruction associated with the selected access (e.g., the block 410).

Figure 5:
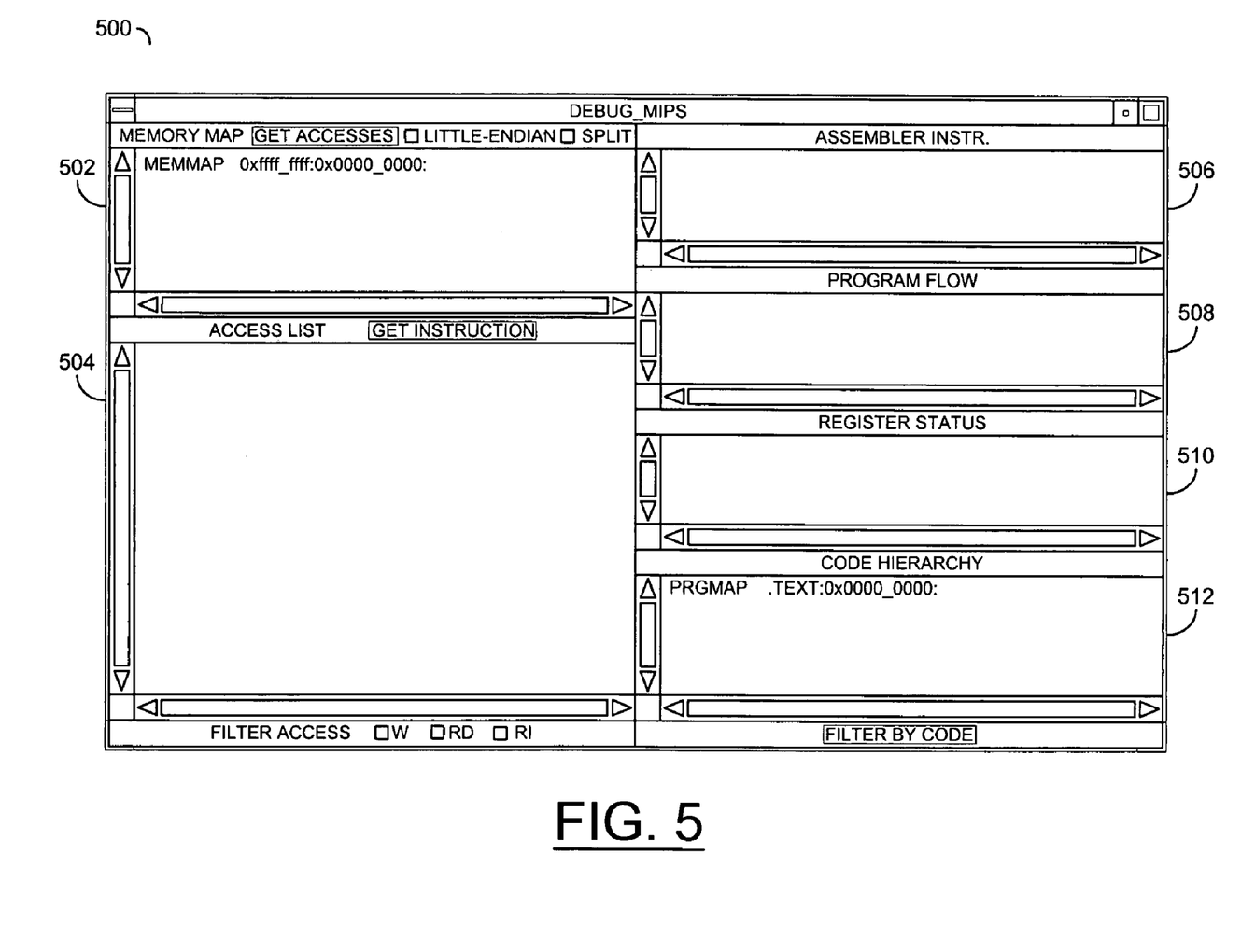
FIG. 5 is a diagram illustrating an example graphic user interface structure in accordance with the present invention.

Referring to FIG. 5, a diagram of an example display 500 illustrating a graphic user interface (GUI) in accordance with the present invention is shown. In one example, a display (or screen) 500 may be displayed on the device 112. The display 500 may comprise a number of regions 502-512. Each region 502-512 may be used to display different types of information during a debugging process in accordance with a preferred embodiment of the present invention. In one example, each of the regions 502-512 may occupy a predetermined portion of the display 500. The display 500 may be implemented, in one example, as a window based presentation. Each of the regions 502-512 may be implemented as a separate (independent) window within the display 500. Alternatively, the regions 502-512 may be implemented as individual frames. The individual regions 502-512 may be cascaded, tiled or presented on top of each other. For example, when the regions 502-512 are presented as independent windows or frames, a click of a mouse button in a particular region 502-512 may result in that region being displayed on top of the other regions. Alternatively, when each of the regions 502-512 are displayed simultaneously in a single window, a selection of an item within a particular one of the regions 502-512 may result in the particular region and/or item being highlighted (e.g., a change in intensity, color, shading or a combination thereof).

In one example, the region 502 may be configured to display information from a user defined memory map. The memory map may be used to direct the bugging process. For example, the memory map may be traversed (e.g., by moving through a hierarchical structure providing increasing detail of the memory space) until a specific memory range or location of interest is found and selected. The region 504 may be implemented (or configured) to display a list of accesses associated with the particular memory address range or location selected in the region 502. In one example, upon selection of the particular memory address in the region 502 and entry of a Get Accesses command, the accesses to the particular selected memory address may be automatically presented in the region 504.

The region 506 may be configured to display information related to the assembler instruction associated with a particular access selected in the region 504. The associated information may comprise: simulation time where the instruction occurred, program and physical addresses, op-code, assembler mnemonic.

The region 508 may display the program flow information up to assembler instruction displayed in the region 506. The program flow information may comprise the test program sections traversed by the processor up to the point where the assembler instruction displayed in the region 506 has been executed.

The region 510 may be configured to display processor internal register status during the execution of the selected assembler instruction in the region 506. The region 512 may be configured to display the code in a hierarchical structure. For example, the hierarchical structure of the code may be divided into modules, each of the modules may be divided into sub-modules and each of the sub-modules may be divided into further sub-modules.

Figure 6:
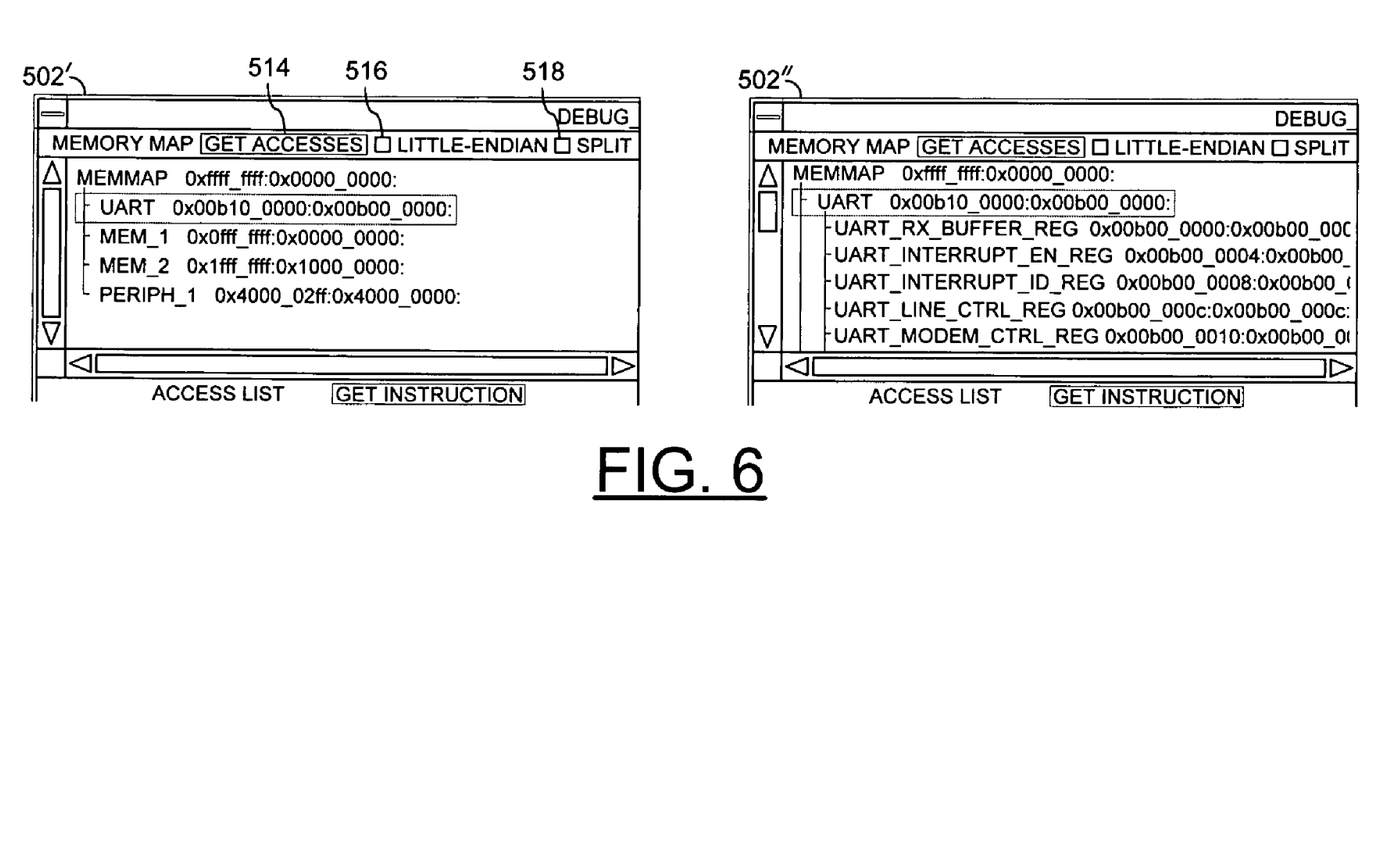
FIG. 6 is a diagram illustrating an example output of the present invention in response to identification of a memory region of interest.

Referring to FIG. 6, a more detailed diagram illustrating an example operation of the region 502 of FIG. 5 is shown. In one example, a region 502' may display a basic memory map for the processor based SoC being debugged. The memory map may be presented as a number of memory ranges (e.g., UART, MEM_1, MEM_2 and PERIPH_1). In one example, the range UART may be selected for a more detailed display of memory addresses. For example, a mouse pointer may be placed on the line containing the UART memory space and a double click of a mouse button may instruct the process to provide more details on the memory space. However, other command entry methods (e.g., one or more key strokes) may be implemented for entering commands. Upon receiving the request for more detail in the memory space, a region 502" may be displayed illustrating a number of sub-regions within the UART memory space. The process may be repeated to provide, for example, further sub-regions.

The region 502 may be configured to allow a user to select specific functions to be performed on the memory map. For example, a number of buttons (e.g., areas within the region 502 that may be configured to generate commands in response to mouse clicks) may be implemented in the region 502. In one example, a button (or control) 514 may be implemented (e.g., GET ACCESSES) that may instruct the debugging process to retrieve accesses associated with a selected memory address. A button (or control) 516 may be implemented which, when selected, changes a representation of memory addresses. In one example, the button 516 may allow memory addresses to be displayed in big endian or little endian format. Another button (or control) 518 may be implemented allowing support of processors performing a split instruction fetch. Such processors generally use two memory cycles to fetch the instruction code. Other buttons (or controls) may be implemented accordingly to meet the design criteria of a particular application.

Referring to FIG. 7, a diagram is shown illustrating an example display showing retrieved accesses to a particular memory location. In one example, a particular memory range or location (e.g., UART_INTERRUPT_EN_REG) may be selected in the region 502. Once the memory location is selected, the Get Accesses command may be received (e.g., by actuating the button in the GUI, etc.). In response to the Get Accesses command, all accesses to the selected memory range (or location) are generally displayed in the region 504.

Figure 8:
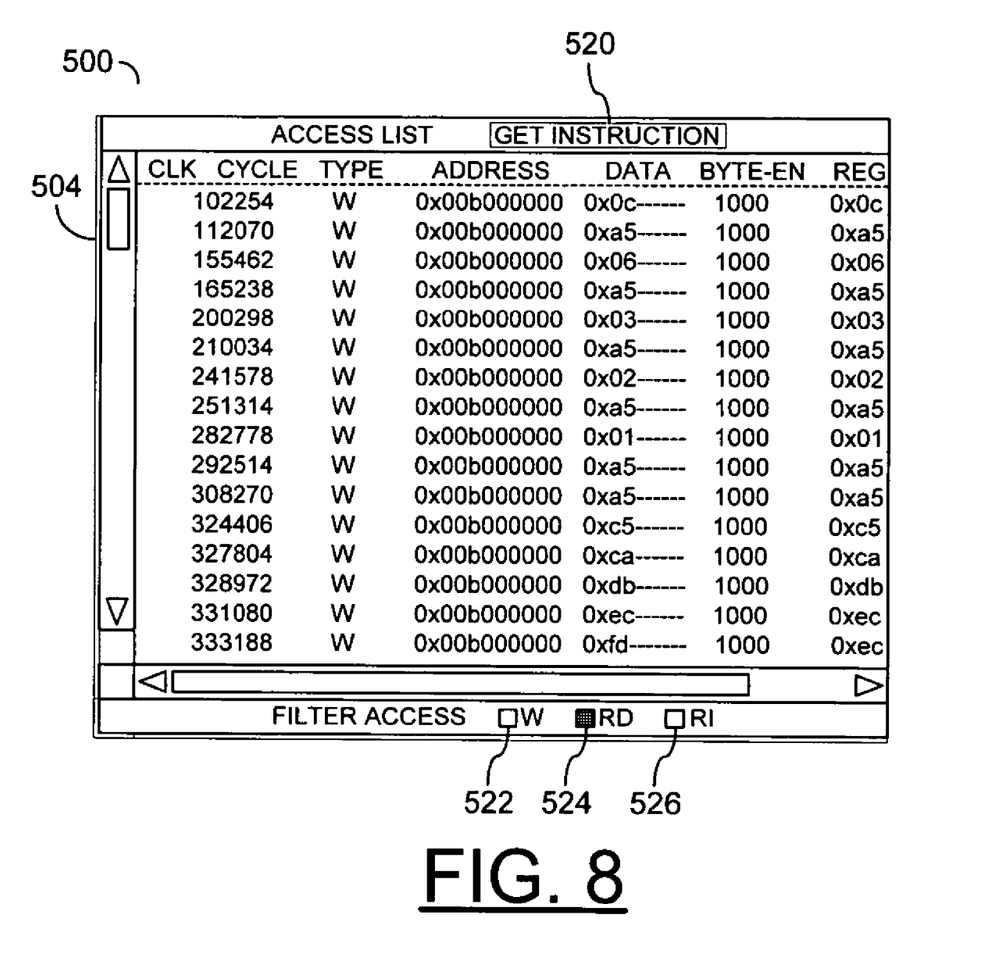
FIG. 8 is a diagram illustrating an example output of the present invention when filtering is selected.

Referring to FIG. 8, a more detailed diagram illustrating an example display of the region 504 is shown. The region 504 may include a number of buttons (or controls) 520-526. The buttons 520-526 may be implemented at predetermined locations within the region 504. By actuating a particular button (e.g., via mouse click, touch screen, etc.), the user may enter commands via the GUI that may instruct the debugging process to preform predetermined tasks associated with the particular control. For example, the button 520 may be configured to instruct the debugging process to get an instruction related to a specific access selected (or identified) in the region 504. The buttons 522-526 may be implemented, for example, to select (or initiate) predetermined filtering procedures. For example, filter check buttons may be implemented allowing the access list displayed in the region 504 to be filtered according to the type of access. In one example, the button 522 may instruct the debug process to filter out (e.g., remove from display) write accesses; the button 524 may instruct the debug process to filter out read data (RD) accesses; the button 526 may instruct the debug process to filter out read instruction accesses. Alternatively, the buttons 522-526 may be configured to instruct the debug process to display the particular type of access.

When all the accesses to a particular memory range have been displayed (as described above in connection with FIG. 7), the accesses may be filtered, for example, by actuating the particular filter button. For example, selecting the button 524 (e.g., the read data access filter) generally results in the listed accesses being reduced to only those accesses not involving read data. Similar results may be obtained by selection of other filter buttons. Other buttons (or commands) may be implemented accordingly to meet the design criteria of a particular application.

Figure 9:
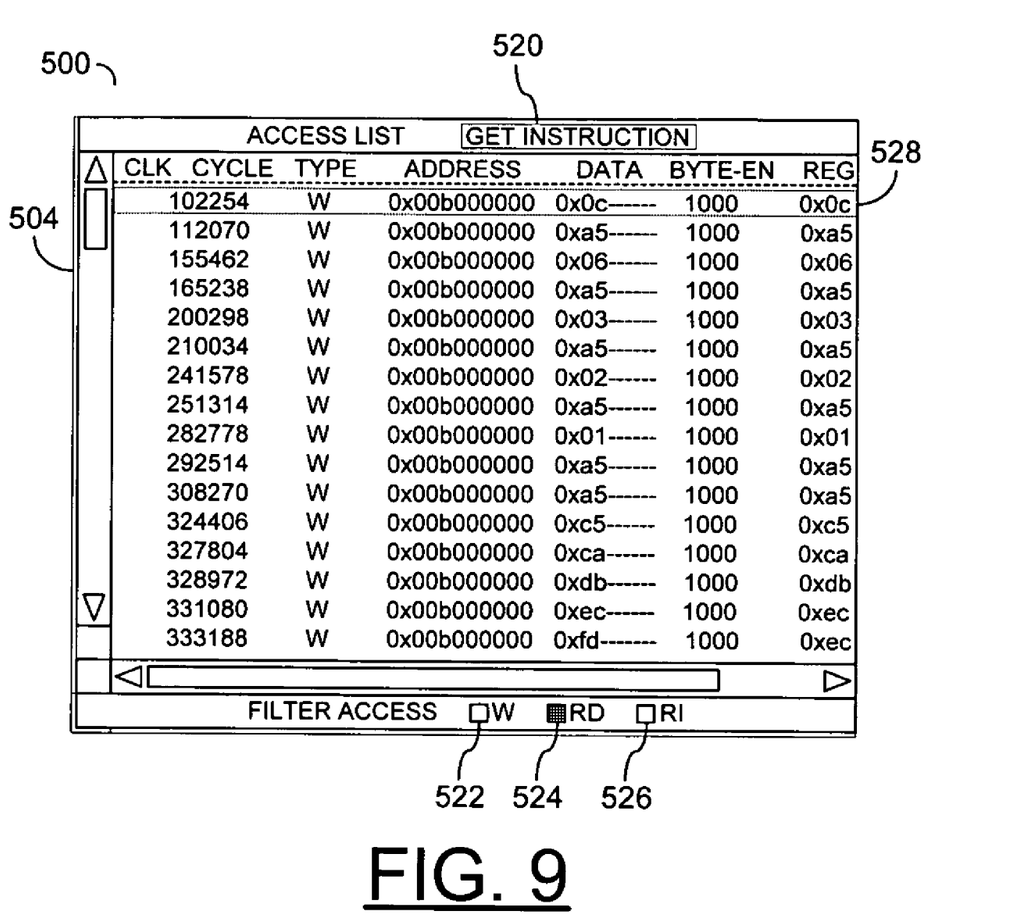
FIG. 9 is a diagram illustrating an example screen of the present invention during selection of an access to be examined.

Referring to FIG. 9, a diagram illustrating an example display for retrieving instructions related to a particular access is shown. Once the list of accesses has been reduced to the accesses of interest, a particular access may be selected. For example, the access during a clock cycle 102254 may be selected (e.g., line 528), in one example, with a mouse. The GUI may be configured to indicate selection of an access by highlighting the selection (e.g., outlining the selection, changing background color, changing text color, changing shading, etc.). Once the particular memory access has been selected, a user request to retrieve the instruction related to that access may be entered, in one example, by activating the Get Instruction button 520.

Figure 10:
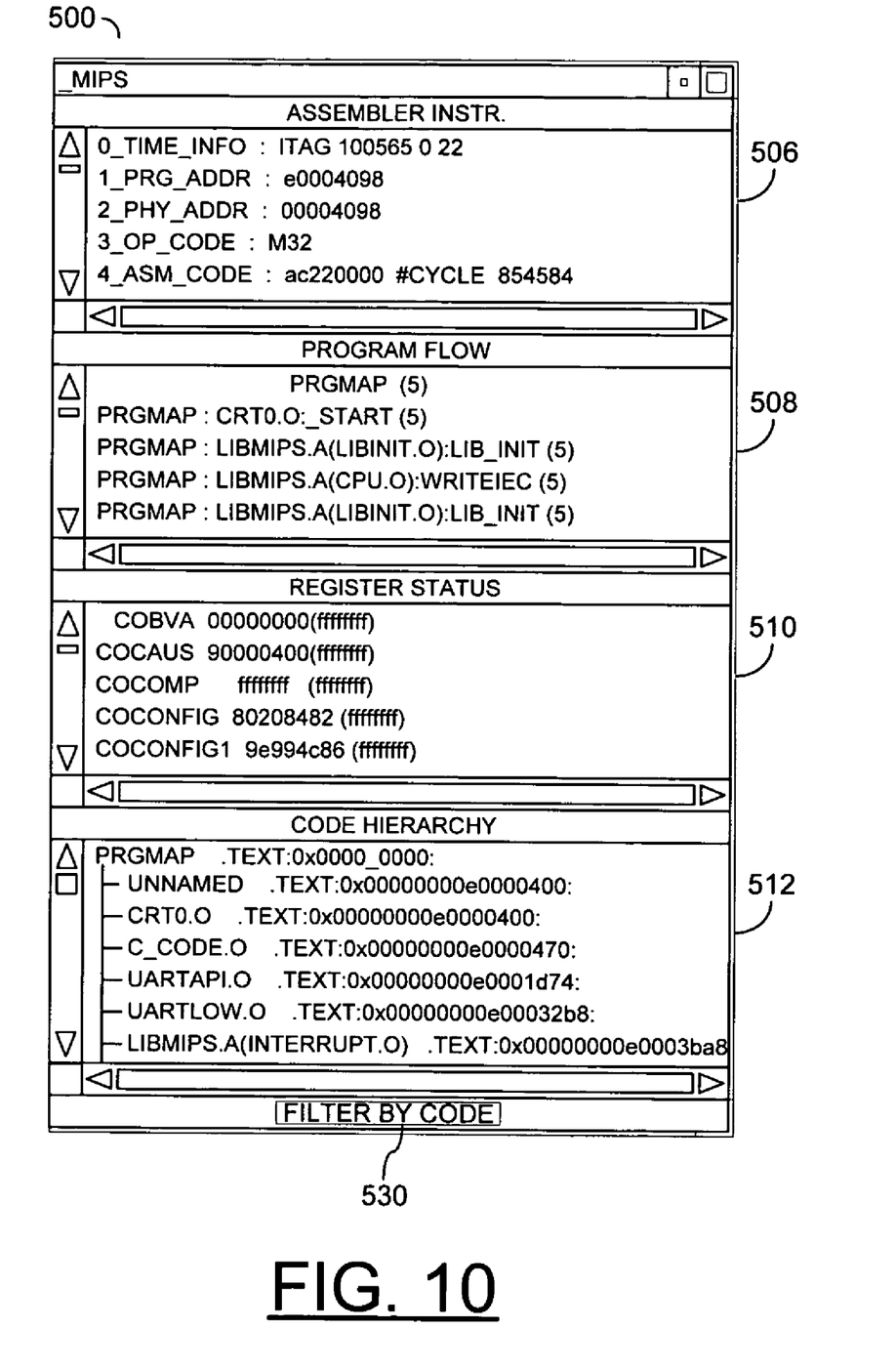
FIG. 10 is a diagram illustrating an example output of the present invention in response to a request for information.

Referring to FIG. 10, a diagram illustrating an example display of information presented in the regions 506-512 in response to a Get Instruction request is shown. In general, once a particular access has been selected in the region 504 and the Get Instruction request received, the present invention may be configured to determine and display debug information. The information may comprise, for example, (i) the assembler instruction code and address associated with the particular memory access selected, (ii) a list of the program flow involving the assembler instruction, (iii) the processor register status during execution of the instruction and (iv) a program map (or code hierarchy). In one example, a button (or control) 530 may be implemented to further filter the memory accesses displayed in the region 504. When the button 530 is activated, the memory accesses may be filtered according to the program region selected in the region (or window) 512. For example, only the memory accesses which occur within the selected program region may be displayed.

The GUI-based tool in accordance with the present invention generally processes, according to user requests, information that may include, but is not limited to: output from simulator and processor simulation models, tracing of processor accesses on memory busses (e.g., AMBA), tracing of instruction execution, tracing of processor internal register status, output from C compilers, map file (program sections with relevant addresses), in-line disassembler (if provided by software (SW) tool chain), user input and memory map. The memory map generally comprises an ASCII file that allows specification of memory regions or specific memory addresses within the complete memory space. Within a memory region, a sub-region may be specified; sub-regions may also be defined within a sub-region itself. The present invention is generally applicable to the majority of the processor based SoC, since the data are available or can be easily obtained from the majority of digital simulators, processor simulation models, and software development kits.

The function performed by the flow diagrams of FIGS. 2-4 and described in connection with FIGS. 5-10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s). For example, a program may be built that is Perl-Tk based and supports MIPS4Ke/MIPS5Kf processors.

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an analysis block configured to generate debug information post-simulation in response to (i) a command input, (ii) one or more simulation outputs, (iii) one or more compiler outputs and (iv) memory map information;
a graphical user interface configured (i) to present said command input in response to one or more user input parameters and (ii) to display said debug information; and
a memory circuit configured to store said memory map information, said one or more simulation outputs and said one or more compiler outputs, wherein (i) said one or more simulation outputs comprise one or more tracings selected from the group consisting of a tracing of processor accesses on a memory bus, a tracing of instruction execution and a tracing of processor internal register status and (ii) said one or more compiler outputs comprise one or more outputs selected from the group consisting of a map file and an in-line disassembler.

2. The apparatus according to claim 1, wherein said one or more user input parameters comprise identification of a memory address.

3. The apparatus according to claim 1, wherein said one or more user input parameters comprise identification of specific memory accesses.

4. The apparatus according to claim 1, wherein said one or more user input parameters comprise one or more of a command for expanding the display of a memory map, a command for retrieving information related to accesses to said memory map, a command for retrieving assembly code related to particular accesses and one or more commands related to filtering operations.

5. The apparatus according to claim 1, wherein said one or more simulation outputs comprise information from one or more of a processor simulator and one or more processor simulation models.

6. The apparatus according to claim 1, wherein said graphical user interface is configured to present said debug information in one or more windows.

7. The apparatus according to claim 1, wherein said graphical user interface is configured to present said debug information in one or more frames.

8. The apparatus according to claim 1, wherein said one or more user input parameters are entered using one or more of a mouse, a keyboard, a touch screen and voice recognition.

9. The apparatus according to claim 8, wherein said graphic user interface is configured to provide an indication of receipt of said user input parameters.

10. The apparatus according to claim 1, wherein said analysis block generates said debug information by post-processing simulation results.

11. The apparatus according to claim 1, wherein said analysis block generates said debug information without interacting with a processor simulator or a processor simulation model.

12. A method for post-simulation debugging RTL simulations of processor based system on chip (SoC) comprising the steps of:

(A) storing memory map information, one or more simulation outputs and one or more compiler outputs in a computer readable storage medium, wherein (i) said one or more simulation outputs comprise one or more tracings selected from the group consisting of a tracing of processor accesses on a memory bus, a tracing of instruction execution and a tracing of processor internal register status and (ii) said one or more compiler outputs comprise one or more outputs selected from the group consisting of a map file and an in-line disassembler;

(B) identifying a memory address to be examined in said memory map information;

(C) retrieving one or more accesses related to said memory address from said tracing of processor accesses on said memory bus;

(D) identifying a specific one of said one or more accesses to be examined; and (E) retrieving one or more types of debug information related to said identified access.

13. The method according to claim 12, wherein said one or more types of debug information comprise one or more assembler instruction codes.

14. The method according to claim 13, wherein said one or more types of debug information comprise a program flow leading to said one or more assembler instruction codes.

15. The method according to claim 12, wherein said one or more types of debug information comprise a register status of said processor.

16. The method according to claim 12, wherein said one or more types of debug information comprise a program structure.

17. The method according to claim 12, wherein retrieving one or more accesses related to said memory address comprises:

responding to activation of a button presented by a graphic user interface.

18. The method according to claim 12, wherein identifying a specific access is performed via a graphic user interface.

19. The method according to claim 12, wherein retrieving one or more types of debug information is performed in response to a button of a graphic user interface being actuated.

20. The method according to claim 12, further comprising the step of:

displaying said retrieved one or more accesses and said retrieved one or more types of debug information using a graphic user interface.

21. The method according to claim 20, further comprising the step of:

modifying information displayed using said graphic user interface in response to one or more filter commands.

22. An apparatus comprising:

means for storing user defined memory map information and simulation results, wherein said simulation results comprise one or more simulation outputs and one or more compiler outputs, and wherein (i) said one or more simulation outputs comprise one or more tracings selected from the group consisting of a tracing of processor accesses on a memory bus, a tracing of instruction execution and a tracing of processor internal register status and (ii) said one or more compiler outputs comprise one or more outputs selected from the group consisting of a map file and an in-line disassembler;

means for identifying a memory address in said user defined memory map information;

means for retrieving one or more accesses related to an identified memory address from said simulation results;

means for identifying a specific access to be examined;

means for retrieving one or more types of debug information related to said specific access from said simulation results.

* * * * *